United States Patent
Takahashi et al.

(10) Patent No.: US 7,057,910 B2
(45) Date of Patent: Jun. 6, 2006

(54) SEMICONDUCTOR DEVICE AND CONTROL METHOD

(75) Inventors: Manabu Takahashi, Osaka (JP); Koji Kawamichi, Osaka (JP); Shohei Oishi, Shiga (JP); Masaru Kohara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/715,848

(22) Filed: Nov. 19, 2003

(65) Prior Publication Data

US 2004/0129957 A1    Jul. 8, 2004

(30) Foreign Application Priority Data

Nov. 19, 2002   (JP) .............................. 2002-335612

(51) Int. Cl.
*H02M 7/20* (2006.01)
*G01R 31/26* (2006.01)

(52) U.S. Cl. ...................... 363/141; 323/322; 323/283; 438/14

(58) Field of Classification Search ........ 318/805–806, 318/811, 138, 599–601, 722, 798; 307/35, 307/151, 39; 323/237, 241, 268, 271–272, 323/282–283, 158, 222, 224; 327/142–144, 327/155–162, 149, 237

See application file for complete search history.

(56) References Cited

U.S. PATENT DOCUMENTS

| 4,621,316 | A | | 11/1986 | Uesugi |
| 5,227,961 | A | | 7/1993 | Claydon et al. |
| 5,408,150 | A | | 4/1995 | Wilcox |
| 5,764,024 | A | * | 6/1998 | Wilson ....................... 318/805 |
| 6,477,067 | B1 | | 11/2002 | Kerkman et al. |
| 6,535,402 | B1 | * | 3/2003 | Ying et al. ..................... 363/41 |
| 6,801,028 | B1 | * | 10/2004 | Kernahan et al. ........... 323/283 |
| 6,819,011 | B1 | * | 11/2004 | Kernahan et al. ............. 307/35 |
| 6,825,644 | B1 | * | 11/2004 | Kernahan et al. ........... 323/283 |
| 6,836,414 | B1 | * | 12/2004 | Batarseh et al. .............. 363/17 |
| 6,841,983 | B1 | * | 1/2005 | Thomas ....................... 323/322 |

FOREIGN PATENT DOCUMENTS

| JP | 10-149876 | | 6/1998 |
| JP | 2000-066702 | A | 3/2000 |
| JP | 2001-275365 | A | 10/2001 |

* cited by examiner

*Primary Examiner*—Michael Lebentritt
*Assistant Examiner*—Andre' Stevenson
(74) *Attorney, Agent, or Firm*—McDermott Will Emery LLP

(57) ABSTRACT

In a semiconductor device for generating complementary PWM signals for, for example, controlling an inverter, a dead time is flexibly added by using a simple architecture. A dead time addition unit adds time elapsing until a value of a timer reaches a set value of a register as a first dead time at a rise of a first PWM signal. On the other hand, time elapsing until the value of the timer reaches a set value of another register is added as a second dead time at a rise of a second PWM signal.

11 Claims, 18 Drawing Sheets

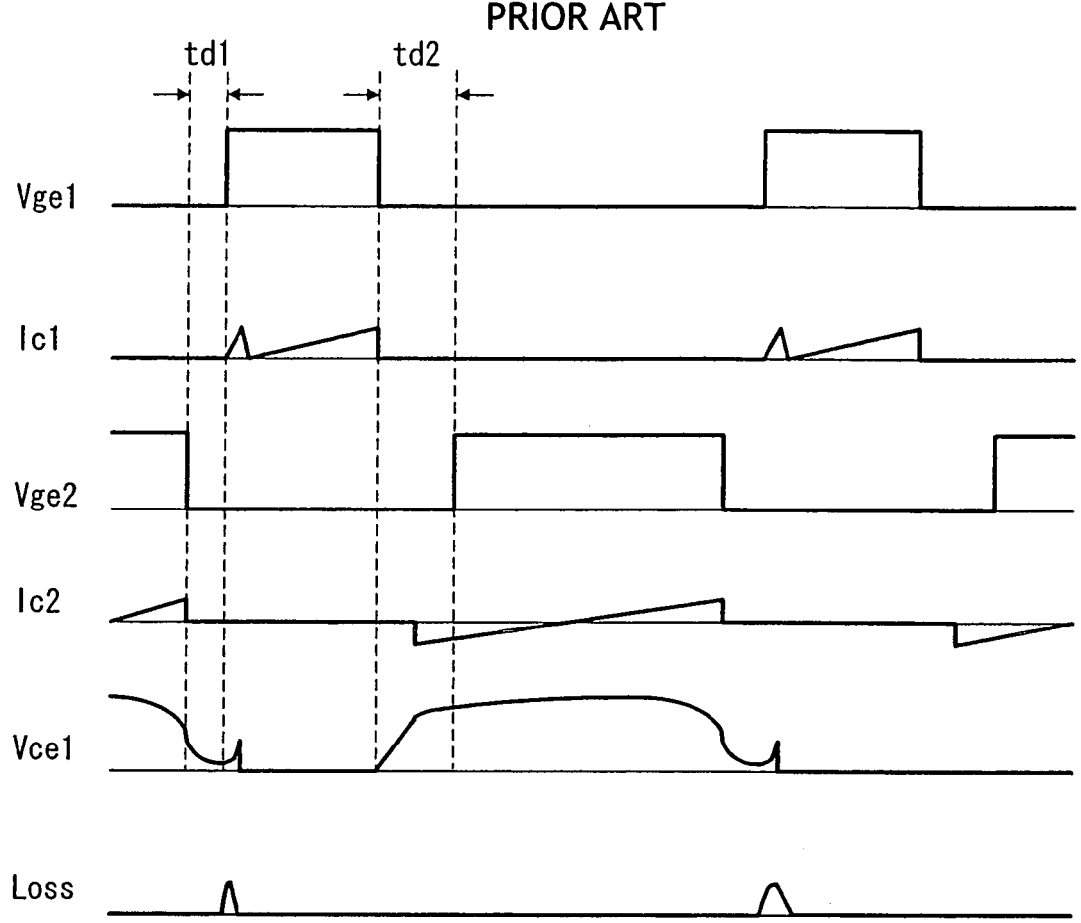

SEMICONDUCTOR DEVICE AND CONTROL METHOD

BACKGROUND OF THE INVENTION

The present invention relates to a semiconductor device for generating complementary PWM signals for, for example, controlling an inverter, and more particularly, it relates to a technique to add dead times to complementary PWM signals.

An inverter circuit 5 including serially connected two switching elements 51 and 52 as shown in FIG. 11 is widely used as a circuit included in an induction heating apparatus such as an IH cooking device (see Japanese Laid-Open Patent Publication No. 10-149876 (hereinafter referred to as Document 1)). Also, an inverter circuit for driving a motor has an architecture in which three combinations for three phases each of serially connected two switching elements are connected in parallel, and this architecture is basically similar to that of the inverter circuit 5.

Such an inverter circuit is generally controlled in accordance with PWM (Pulse Width Modulation) signals having a time at which none of the phases are simultaneously in an ON state (i.e., a dead time). An example of such signals is shown in FIG. 12A. One of the roles of the dead time is preventing an inverter control circuit from being broken by a through current passing when two switching elements are simultaneously in an ON state as shown in FIG. 12B. Also, in general, the dead time is set in order to minimize power loss of switching elements by setting optimum switching timings in accordance with the on-off characteristics of two different switching elements as shown in FIG. 13. The power loss is obtained as a product of a current and a voltage attained in on-off switching.

Conventionally, the following three methods are known for setting a dead time: 1) General PWM outputs are used and a dead time is added on a control circuit; 2) PWM outputs with a given dead time supplied by a semiconductor device are used; and 3) the methods 1) and 2) are combined.

The method 1) is described in, for example, Document 1, and a dead time can be set by adding a control circuit to an inverter driving circuit for controlling an induction heating cooking device. FIG. 11 described above shows a basic circuit configuration employed in this case, in which a dead time setting circuit 7 generates a signal for simultaneously turning off the two switching elements 51 and 52 by a driving control circuit 6. As shown in FIG. 13, a dead time td1 is set as a period elapsing from time when Vge2 becomes 0 V and the switching element 52 is turned off until time when the residual voltage of Vce1 is minimized, and a dead time td2 is set as a period elapsing from time when Vge1 becomes 0 V and the switching element 51 is turned off until the minus current of Ic2 (i.e., a freewheel diode current included in the switching element 51) is substantially halved. Both the dead times are determined in accordance with a constant of the circuit.

Apart from the aforementioned methods, a method by using a combination of a PWM output and a delay circuit is known. For example, as shown in FIG. 14, dead times are added by providing delays to respective PWM signals by CR circuits 53 and 54 arbitrarily set. Thus, two kinds of output signals with dead times as shown in FIG. 15 can be generated.

Alternatively, for avoiding necessity for adding a control circuit, a microcomputer having a function to generate PWM outputs with dead times has been realized. In setting a dead time in this case, one dead time register is used for setting a dead time, so as to add the same dead time at on-timing and off-timing of the PWM signal.

Many of such microcomputers for controlling an inverter include a counter and a comparator. The counter counts up from 0 to a frequency set value, during which the count value and a duty set value are compared with each other. When the count value and the duty set value accord with each other, an output signal is inverted so as to generate a reference PWM signal. At this point, a dead time is added by comparing the count value and a dead time set value with each other and delaying the on-timing from the inverting timing until they accord with each other. In this case, the dead time can be set as a given period not depending upon the characteristic of a switching element.

However, in the method described in Document 1 or in the method using the CR circuits, the dead time to be set is determined by hardware on a substrate, and therefore, merely a predetermined value can be set for each switching element. Therefore, it is difficult to change/set the optimum value of a dead time, and in order to attain advanced control, for example, it is necessary to provide a control circuit part for changing CR components by hardware. Furthermore, it is difficult to perform precise control because of the waveform of the resultant PWM signal having a time constant and owing to variation in components.

Furthermore, in the method for obtaining a PWM output with a dead time by using the microcomputer for controlling an inverter, since merely one dead time register is used, merely the common dead time can be added at the rise and the fall. This does not cause any particular problem in controlling an inverter circuit in which pairing switching elements have symmetrical characteristics. However, in controlling an inverter circuit in which pairing switching elements have different characteristics, it is desired to individually set optimum dead times, and hence, this method is difficult to employ in such a case.

SUMMARY OF THE INVENTION

An object of the invention is, in a semiconductor device for generating complementary PWM signals for controlling, for example, an inverter, flexibly adding a dead time by using a simple architecture.

Specifically, according to a first aspect of the invention, the semiconductor device includes a complementary PWM signal generation unit for generating a first PWM signal and a second PWM signal corresponding to an inverted signal of the first PWM signal; and a dead time addition unit for adding a first dead time at a rise of the first PWM signal and a second dead time at a rise of the second PWM signal, and the first dead time and the second dead time are individually settable in the dead time addition unit.

In this aspect, the first dead time added at the rise of the first PWM signal and the second dead time added at the rise of the second PWM signal are individually set by the dead time addition unit. Therefore, advanced control can be flexibly realized as compared with the conventional technique.

Preferably, the dead time addition unit of the semiconductor device according to the first aspect includes a dead time timer; and first and second dead time set registers, and time elapsing until a value of the dead time timer reaches a set value of the first dead time set register is set as the first dead time, and time elapsing until the value of the dead time timer reaches a set value of the second dead time set register is set as the second dead time.

Preferably, the dead time addition unit of the semiconductor device according to the first aspect includes first and second dead time timers; and first and second dead time set registers, and time elapsing until a value of the first dead time timer reaches a set value of the first dead time set register is set as the first dead time, and time elapsing until a value of the second dead time timer reaches a set value of the second dead time set register is set as the second dead time.

Preferably, the dead time addition unit of the semiconductor device according to the first aspect includes first and second dead time set registers; and a comparator for comparing a count value of a cycle counter included in the complementary PWM generation unit with set values of the first and second dead time set registers, and the first dead time is set on the basis of a result of comparison by the comparator with the set value of the first dead time set register, and the second dead time is set on the basis of a result of comparison by the comparator with the set value of the second dead time set register.

Preferably, the dead time addition unit of the semiconductor device according to the first aspect includes first and second dead time set registers; a first comparator for comparing a count value of a cycle timer included in the complementary PWM signal generation unit with a set value of the first dead time set register; and a second comparator for comparing the count value of the cycle timer with a set value of the second dead time set register, and the first dead time is set on the basis of a result of comparison by the first comparator and the second dead time is set on the basis of a result of comparison by the second comparator.

In the semiconductor device according to the first aspect, at least one of the first and second dead times is preferably changeable in accordance with a dead time switching input.

According to a second aspect of the invention, in the control method employed in an induction heating apparatus that includes an inverter circuit for performing a heating operation with a coil and the aforementioned semiconductor device for controlling the inverter circuit by supplying the first and second PWM signals to which dead times have been added, the control method includes the steps of the inverter circuit supplying a signal to the semiconductor device as the dead time switching input; and the semiconductor device changing at least one of the first and second dead times in accordance with the supplied dead time switching input.

BRIEF DESCRIPTION OF THE DRAWINGS

FIG. 13 is a timing chart for showing the operation of the circuit of FIG. 11;

DETAILED DESCRIPTION OF THE INVENTION

Embodiment 1

Figure 1:
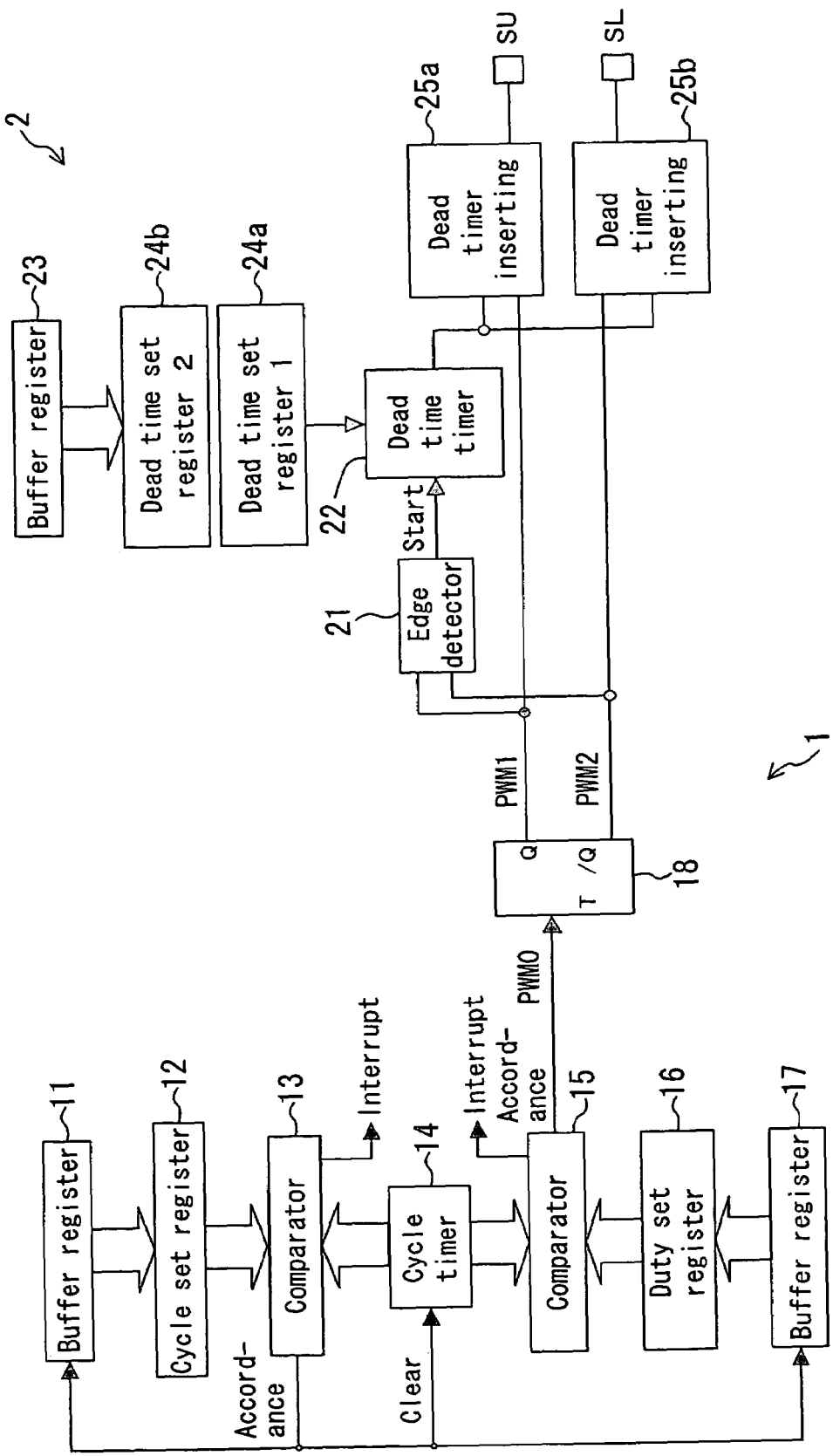
FIG. 1 is a block diagram for showing the architecture of a semiconductor device according to Embodiment 1 of the invention.

FIG. 1 is a block diagram for showing the architecture of a semiconductor device according to Embodiment 1 of the invention. The semiconductor device of FIG. 1 generates PWM signals used for controlling an inverter and is typically realized in a microcomputer.

In FIG. 1, a complementary PWM generation unit 1 generates complementary PWM signals not having a dead time yet, namely, a first PWM signal PWM1 and a second PWM signal PWM2 that is an inverted signal of the first PWM signal PWM1. The complementary PWM generation unit 1 includes buffer registers 11 and 17, a cycle set register 12, comparators 13 and 15, a cycle timer 14, a duty set register 16 and a T flip-flop 18. The cycle timer 14 is restarted at the time of overflow or when its count value accords with a set value of the cycle set register 12 to be compared, so as to set the cycle of an original PWM signal PWM0. Also, the ON period of the original PWM signal PWM0 is set based on the time when the count value of the cycle timer 14 accords with a set value of the duty set register 16 to be compared.

A dead time addition unit 2 adds dead times respectively to the first and second PWM signals PWM1 and PWM2 generated by the complementary PWM generation unit 1, and includes an edge detector 21, a dead time timer 22, a buffer register 23, serially disposed first and second dead time set registers 24a and 24b, and first and second dead time inserting parts 25a and 25b. The dead time timer 22 is restarted at the timing of activating the cycle timer 14 and in synchronization with accordance between compared values of the cycle timer 14 and the duty set resistor 16. A time elapsing until a value of the dead time timer 22 reaches a set value of the first dead time set register 24a is added as a first dead time at the rise of the first PWM signal PWM1, and a time elapsing until the value of the dead time timer 22 reaches a set value of the second dead time set register 241b is added as a second dead time at the rise of the second PWM signal PWM2. Thus, an upper phase signal SU and a lower phase signal SL are generated.

Interrupt-service is employed for setting data in the buffer register 23 used for setting the dead times. In interrupt resulting from accordance between compared values of the cycle timer 14 and the duty set register 16, a set value of the second dead time is set, and in interrupt resulting from accordance between compared values of the cycle timer 14 and the cycle set register 12, a set value of the first dead time is set. Also, at the timings of the respective interrupts, data transfer from the second dead time set register 24b to the first dead time register 24a and data transfer from the buffer register 23 to the second dead time set register 24b are carried out. In this manner, the set value of the first dead time is set in the first dead time set register 24a at the accordance between compared values of the cycle timer 14 and the cycle set register 12, and the set value of the second dead time is set at the timing of the accordance between compared values of the cycle timer 14 and the duty set register 16.

Figure 2:
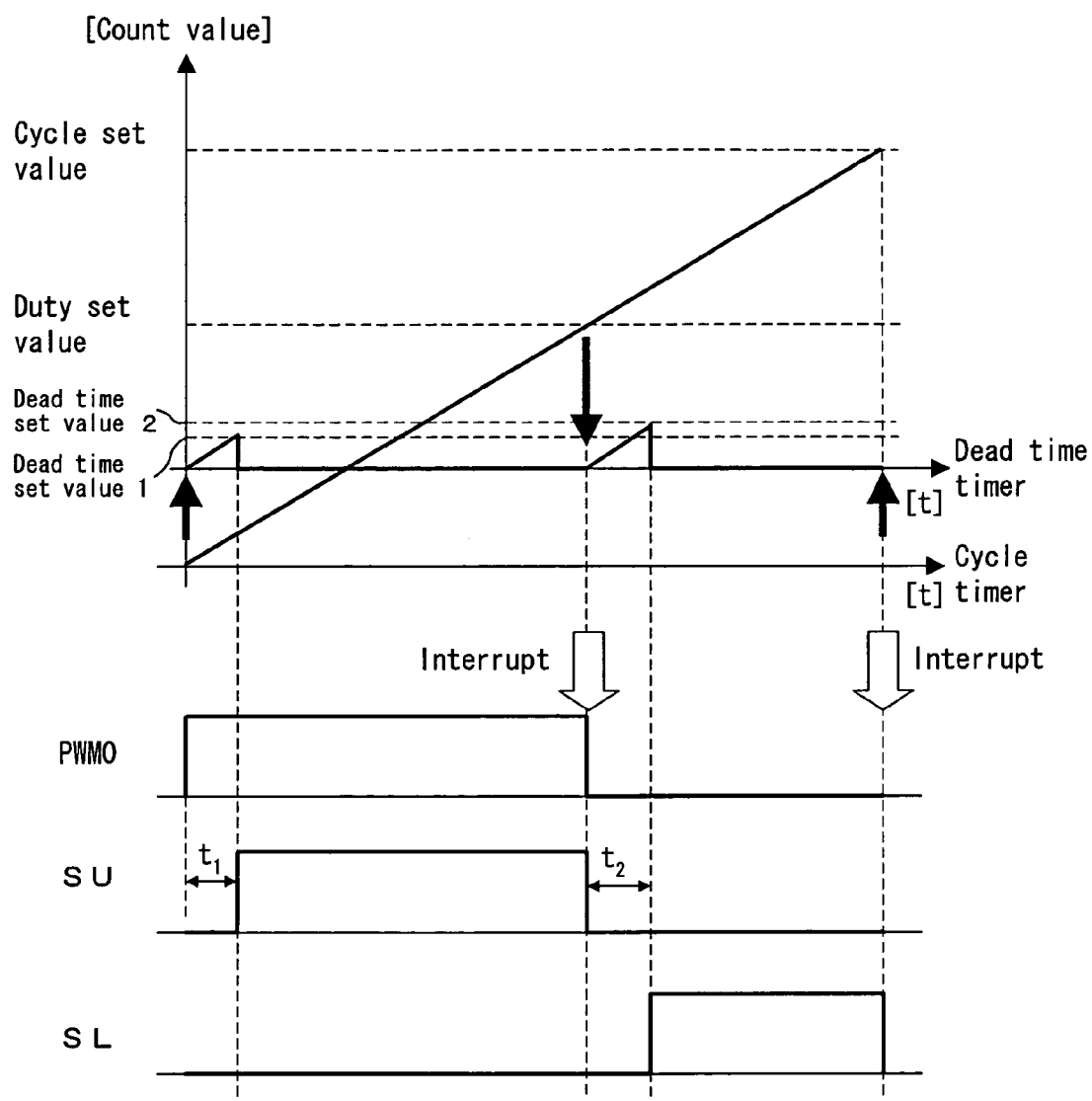
FIG. 2 is a timing chart for showing the operation of the semiconductor device of FIG. 1.

FIG. 2 is a timing chart for showing the operation of the semiconductor device of FIG. 1. As shown in FIG. 2, at the count start of the cycle timer 14, the original PWM signal PWM0 rises and the dead time timer 22 starts counting. When the count value of the dead time timer 22 reaches the set value of the first dead time set register 24a (i.e., a set value of the first dead time), the upper phase signal SU rises and the first dead time t1 is set. Thereafter, when the count value of the cycle timer 14 reaches the set value of the duty set register 16, the original PWM signal PWM0 falls and the upper phase signal SU falls.

At this point, the dead time timer 22 restarts counting, and when its count value reaches the set value of the first dead time set register 24a (i.e., a set value of the second dead time), the lower phase signal SL rises and the second dead time t2 is set. Thereafter, when the count value of the cycle timer 14 reaches the set value of the cycle set register 12, the lower signal SL falls.

In this manner, according to this embodiment, the first dead time to be added at the rise of the first PWM signal and the second dead time to be added at the rise of the second PWM signal can be individually set.

Also, compared with an architecture (comparative architecture) in which a set value of a dead time is changed by using a dead time cycle register, this embodiment exhibits the following merit: Since the comparative architecture does not include a buffer register for setting a dead time, the register value cannot be updated at optimum timing. Accordingly, the register value should be changed after stopping the PWM outputs so as not to reverse the magnitude relationship between the set value of the dead time register and the count value of the dead time counter.

In contrast, according to this embodiment, although a set value of a dead time should be changed during the interrupt-service, the data transfer between the two dead time set registers can be executed at the optimum timing by hardware and hence can be easily carried out without stopping the PWM outputs.

Embodiment 2

Figure 3:
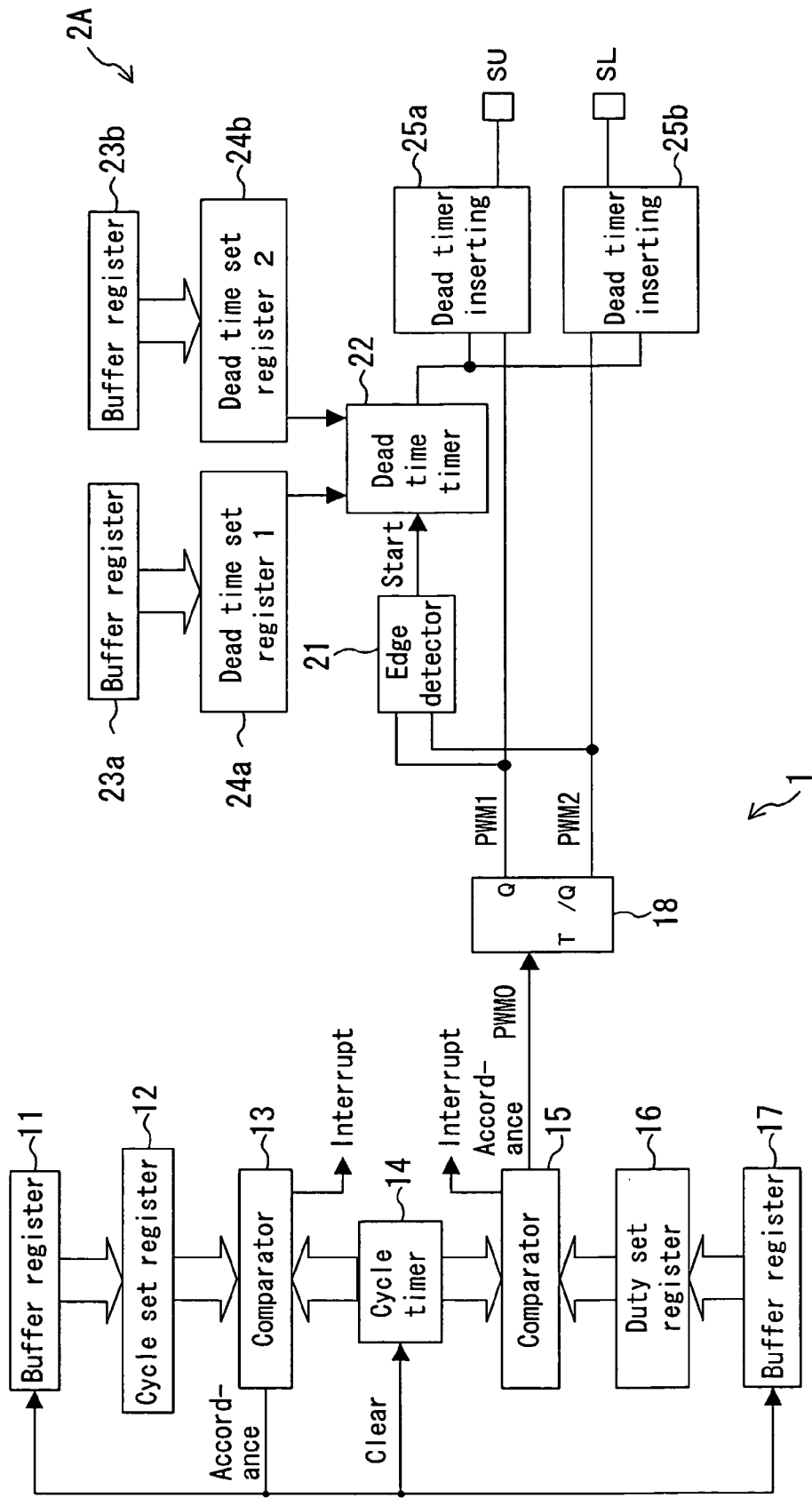
FIG. 3 is a block diagram for showing the architecture of a semiconductor device according to Embodiment 2 of the invention.

FIG. 3 is a block diagram for showing the architecture of a semiconductor device according to Embodiment 2 of the invention, in which like reference numerals are used to refer to like elements shown in FIG. 1. Differently from the architecture shown in FIG. 1, first and second dead time set registers 24a and 24b are disposed in parallel in a dead time addition unit 2A and are respectively provided with buffer registers 23a and 23b.

Figure 4:
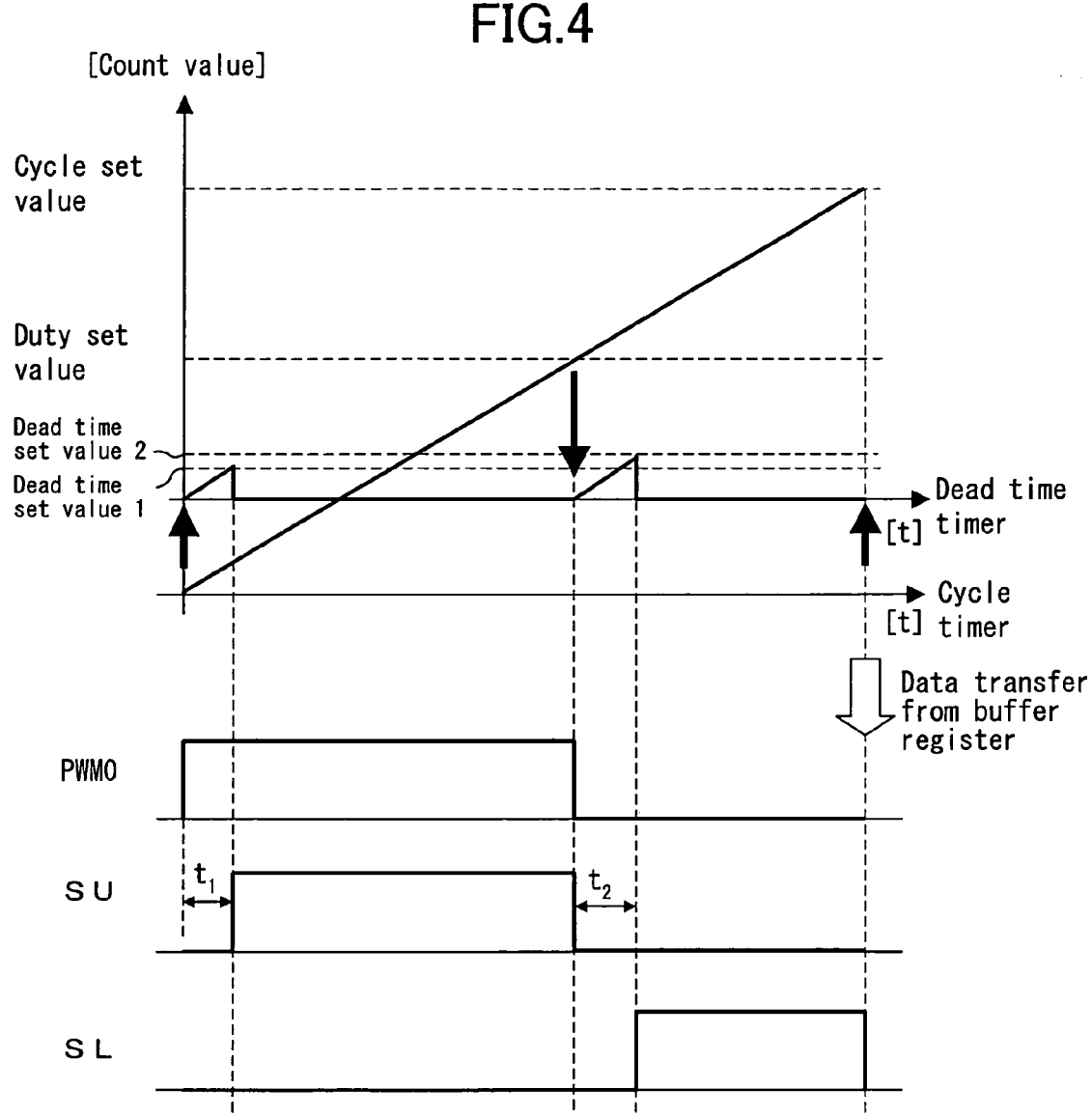
FIG. 4 is a timing chart for showing the operation of the semiconductor device of FIG. 3.

FIG. 4 is a timing chart for showing the operation of the semiconductor device of FIG. 3, which is basically the same as that of Embodiment 1. However, set values of the first and second dead time set registers 24a and 24b are updated at timing of accordance between compared values of a cycle timer 14 and a cycle set register 12.

In other words, in this embodiment, although one buffer register is additionally provided to the architecture of Embodiment 1, there is no need to change set values of the dead times during the interrupt for setting the PWM frequency and the interrupt for setting the duty. Also, the buffer register is used simply for transferring data to the dead time set register at given timing (periodically). Accordingly, this architecture can be realized without increasing the burden of a CPU.

Embodiment 3

Figure 5:
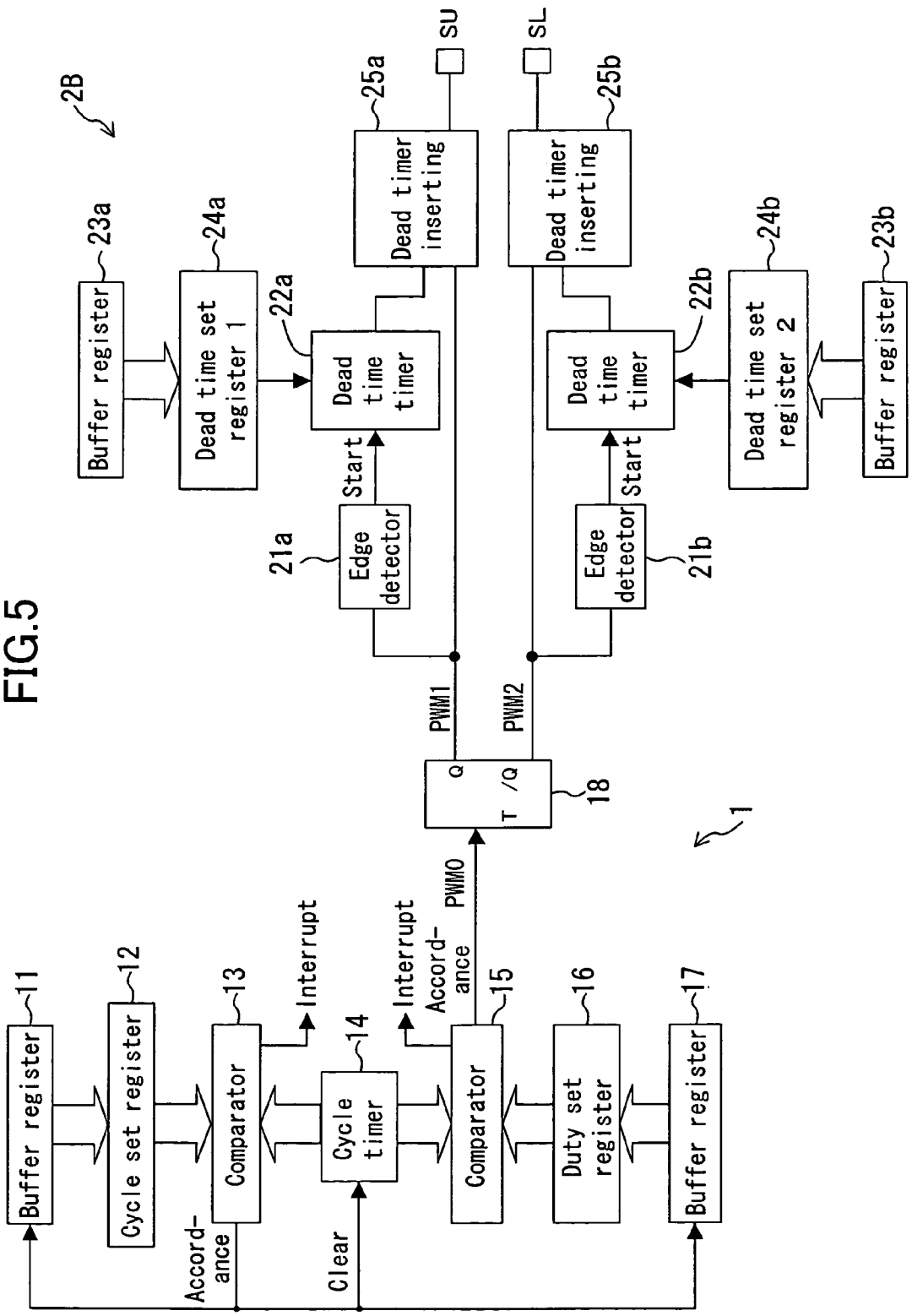
FIG. 5 is a block diagram for showing the architecture of a semiconductor device according to Embodiment 3 of the invention.

FIG. 5 is a block diagram for showing the architecture of a semiconductor device according to Embodiment 3, in which like reference numerals are used to refer to like elements shown in FIG. 3. Differently from the architecture shown in FIG. 3, first and second dead time timers 22a and 22b are respectively provided for first and second dead times in a dead time addition unit 2B. The first dead time timer 22a is activated in synchronization with the activation timing of a cycle timer 14, and the second dead time timer 22b is activated in synchronization with accordance between compared values of the cycle timer 14 and a duty set register 16.

Figure 6:
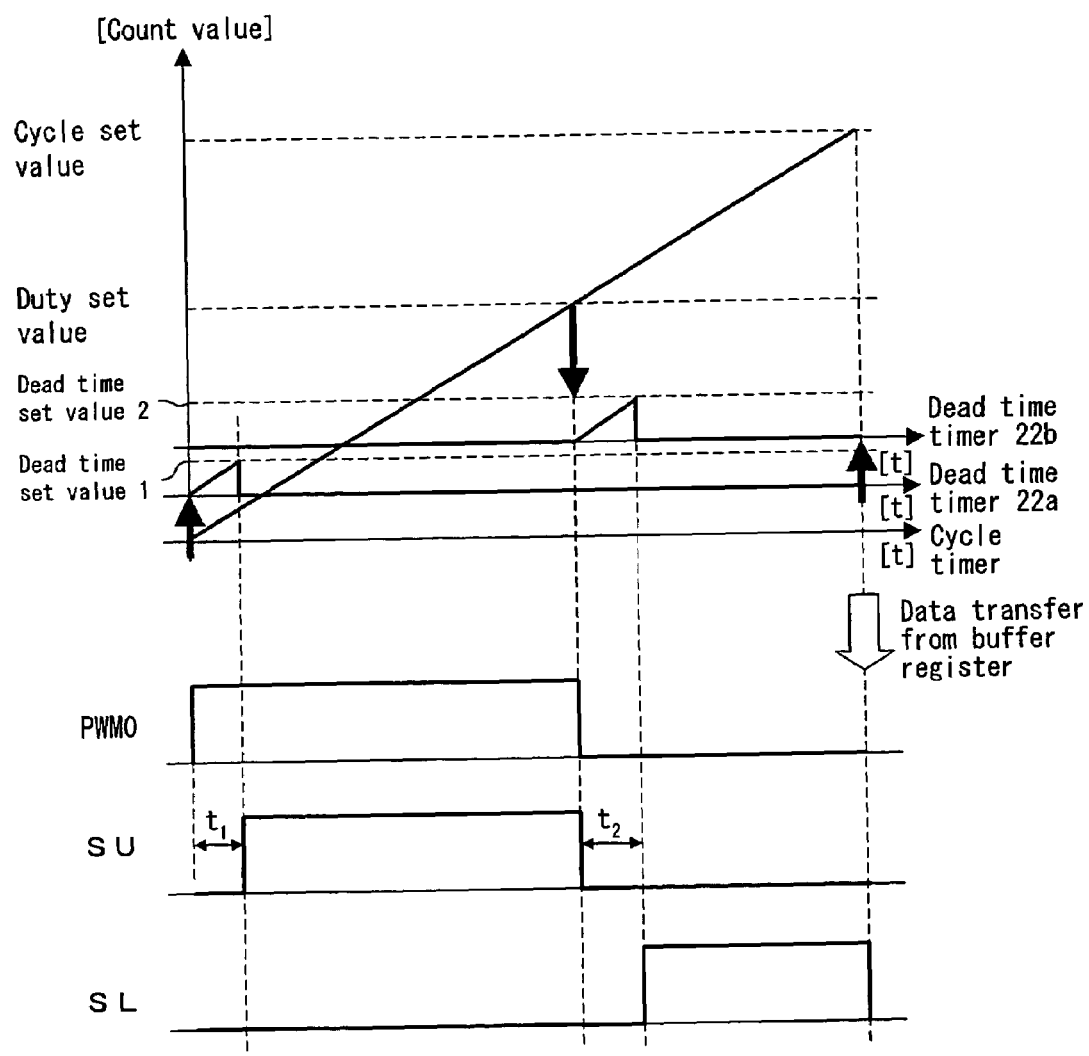
FIG. 6 is a timing chart for showing the operation of the semiconductor device of FIG. 5.

FIG. 6 is a timing chart for showing the operation of the semiconductor device of FIG. 5. As shown in FIG. 6, at the count start of the cycle timer 14, an original PWM signal PWM0 rises and the first dead time timer 22a starts counting. When the count value of the first dead time timer 22a reaches a set value of a first dead time set register 24a, an upper phase signal SU rises and a first dead time t1 is set. Thereafter, when the count value of the cycle timer 14 reaches the set value of the duty set register 16, the original PWM signal PWM0 falls and the upper phase signal SU falls.

At this point, the second dead time timer 22b restarts counting, and when its count value reaches a set value of a second dead time set register 24b, a lower phase signal SL rises and a second dead time t2 is set. Thereafter, when the count value of the cycle timer 14 reaches a set value of a cycle set register 12, the lower phase signal SL falls.

In this manner, also in this embodiment, the first dead time to be added at the rise of the first PWM signal and the second dead time to be added at the rise of the second PWM signal can be individually set. Furthermore, although one dead time timer is additionally provided in this embodiment to the architecture of Embodiment 1 or 2, since there is no need to change the set value of the dead time during the interrupt-service in this embodiment, the architecture of this embodiment can be realized without increasing the burden of a CPU.

Also, since the timer additionally provided in this embodiment is used simply for counting a set time, a timer conventionally included in a microcomputer can be used as this timer, and therefore, the timer can be easily realized.

Embodiment 4

Figure 7:
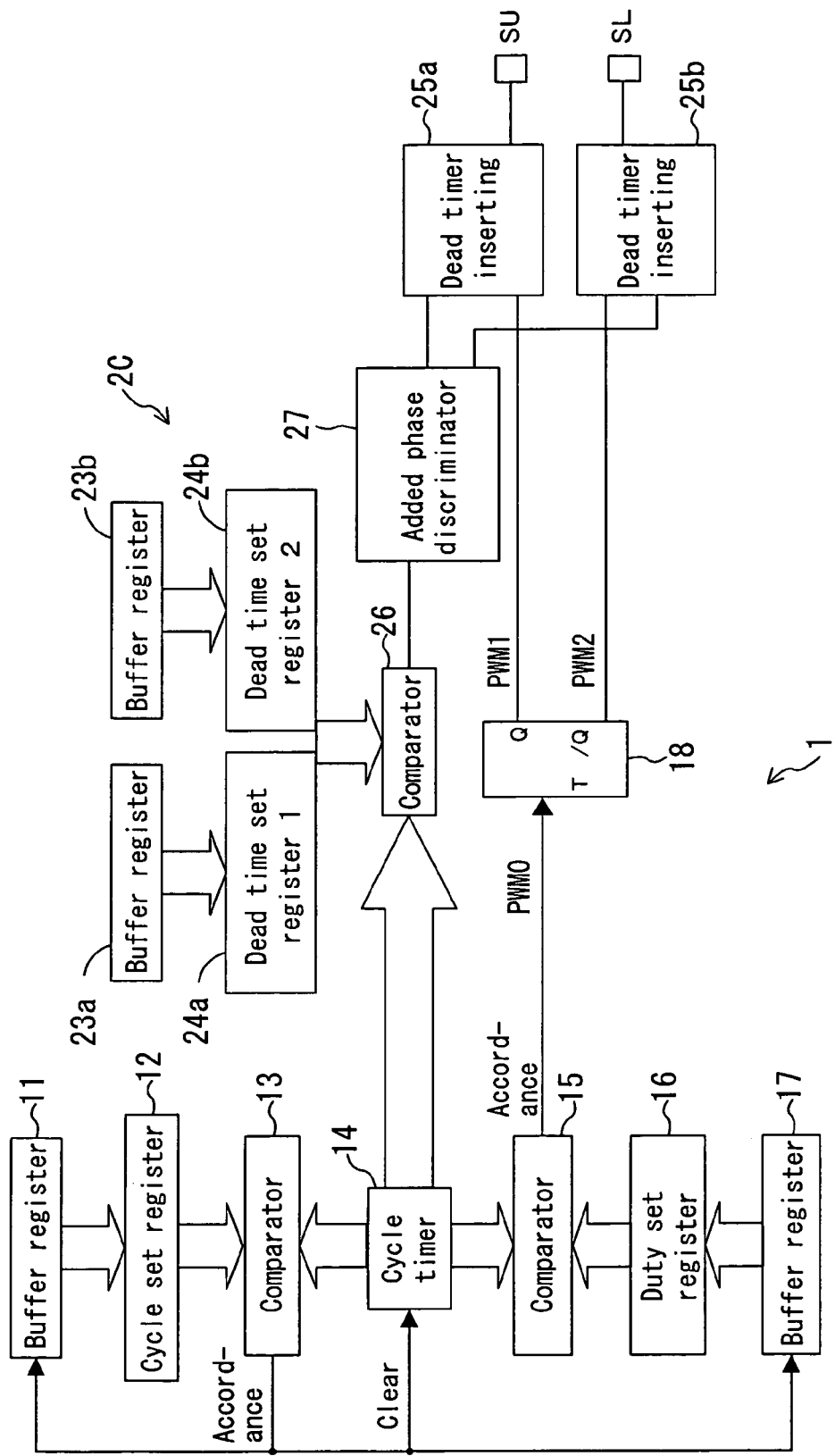
FIG. 7 is a block diagram for showing the architecture of a semiconductor device according to Embodiment 4 of the invention.

FIG. 7 is a block diagram for showing the architecture of a semiconductor device according to Embodiment 4, in which like reference numerals are used to refer to like elements shown in FIG. 3. Differently from the architecture shown in FIG. 3, the dead time timer and the edge detector are omitted and a comparator 26 and an added phase discriminator 27 are provided instead in a dead time addition unit 2C.

The comparator 26 compares a count value of a cycle timer 14 with set values of first and second dead time set registers 24a and 24b. In the case where the comparator 26 detects accordance between these values, the added phase discriminator 27 instructs a first dead time inserting part 25a to add a first dead time when the count value accords with the set value of the first dead time set register 24a, and instructs a second dead time inserting part 25b to add a second dead time when the count value accords with the set value of the second dead time set register 24b.

Figure 8:
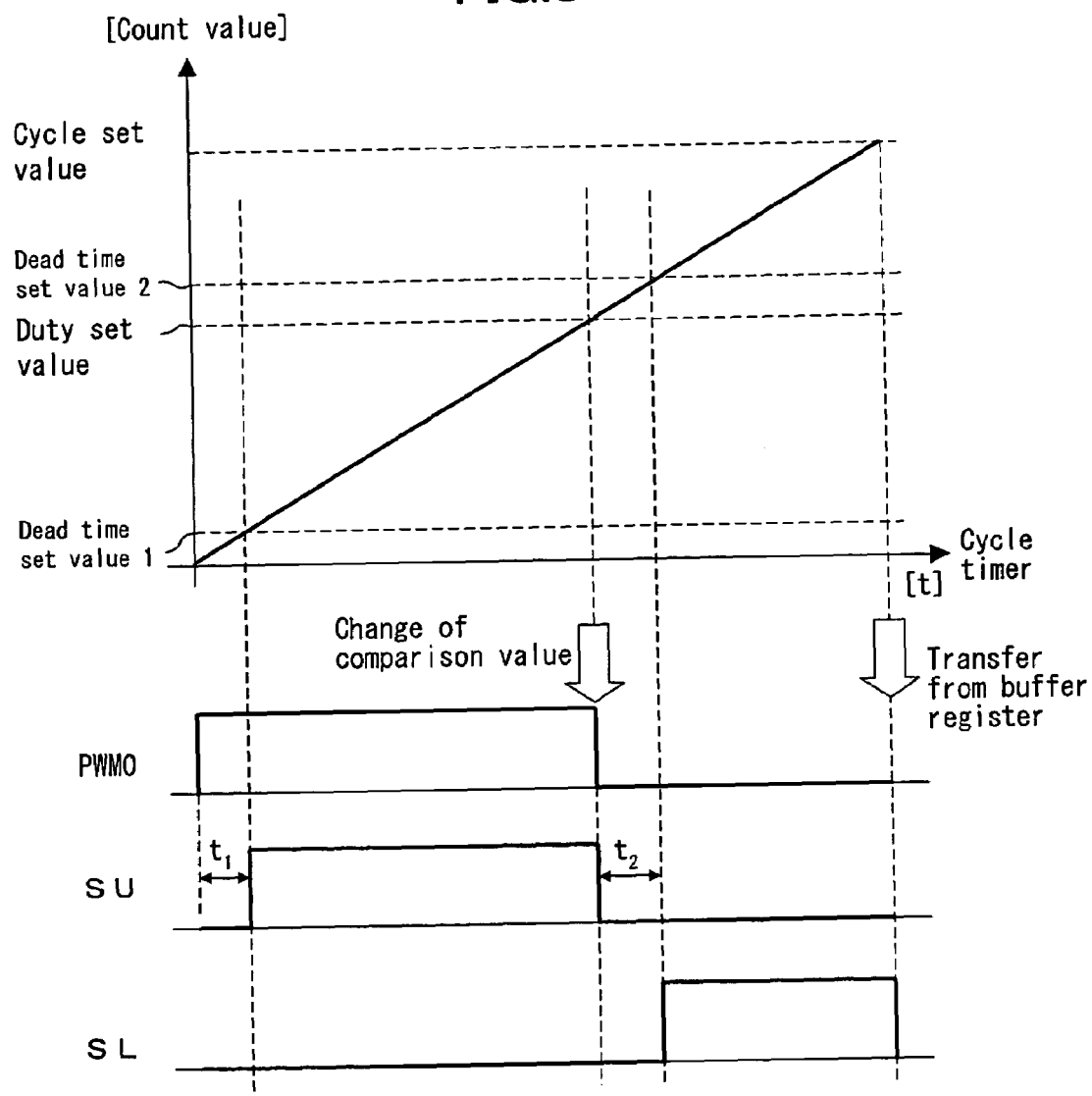
FIG. 8 is a timing chart for showing the operation of the semiconductor device of FIG. 7.

FIG. 8 is a timing chart for showing the operation of the semiconductor device of FIG. 7. As shown in FIG. 8, at the count start of the cycle timer 14, an original PWM signal PWM0 rises. When the comparators 26 detects that the count value of the cycle timer 14 reaches the set value of the first dead time set register 24a, an upper phase signal SU rises and a first dead time t1 is set. Thereafter, when the count value of the cycle timer 14 reaches the set value of the duty set register 16, the original PWM signal PWM0 falls and the upper phase signal SU falls. At this point, the comparison reference of the comparator 26 is switched from the set value of the first dead time set register 24a to a set value of the second dead time set register 24b.

Furthermore, when the count value of the cycle timer 14 reaches the set value of the second dead time set register 24b, a lower phase signal SL rises and a second dead time t2 is set. Thereafter, when the count value of the cycle timer 14 reaches a set value of a cycle set register 12, the lower signal SL falls. At this point, data are transferred from first and second buffer registers 23a and 23b to the first and second dead time set registers 24a and 24b, respectively, and the comparison reference of the comparator 26 is switched from the set value of the second dead time set register 24b to the set value of the first dead time set register 24a.

In this manner, also in this embodiment, the first dead time to be added at the rise of the first PWM signal and the second dead time to be added at the rise of the second PWM signal can be individually set. Also, a dead time timer can be omitted by utilizing the cycle timer, resulting in simplifying the architecture. Furthermore, the circuit for the comparator can be obtained by using a circuit included in a general microcomputer and hence can be easily realized.

Embodiment 5

Figure 9:
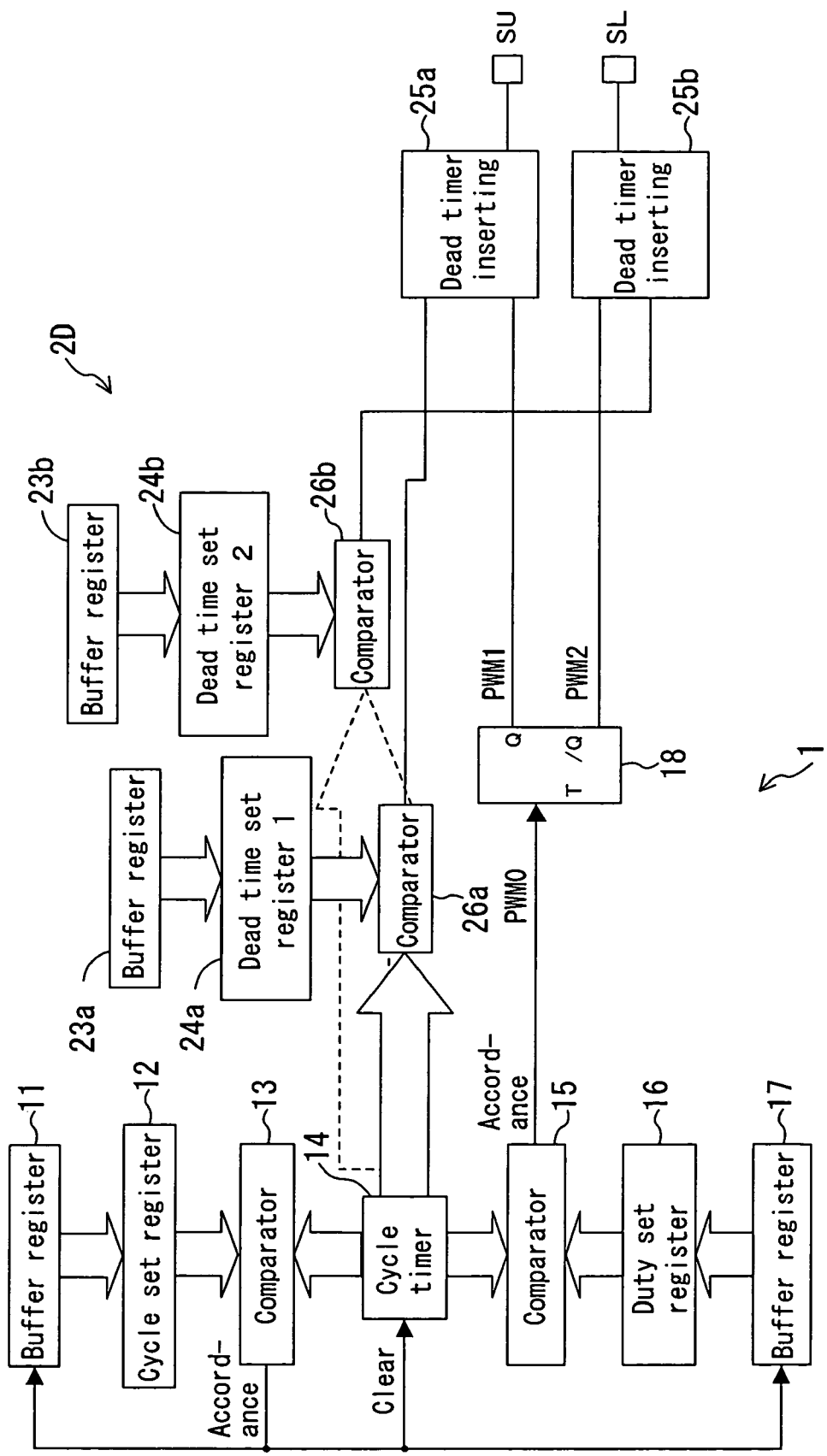
FIG. 9 is a block diagram for showing the architecture of a semiconductor device according to Embodiment 5 of the invention.

FIG. 9 is a block diagram for showing the architecture of a semiconductor device according to Embodiment 5 of the invention, in which like reference numerals are used to refer to like elements shown in FIG. 7. Differently from the architecture shown in FIG. 7, first and second comparators 26a and 26b are provided respectively for first and second dead time set registers 24a and 24b in a dead time addition unit 2D.

Figure 10:
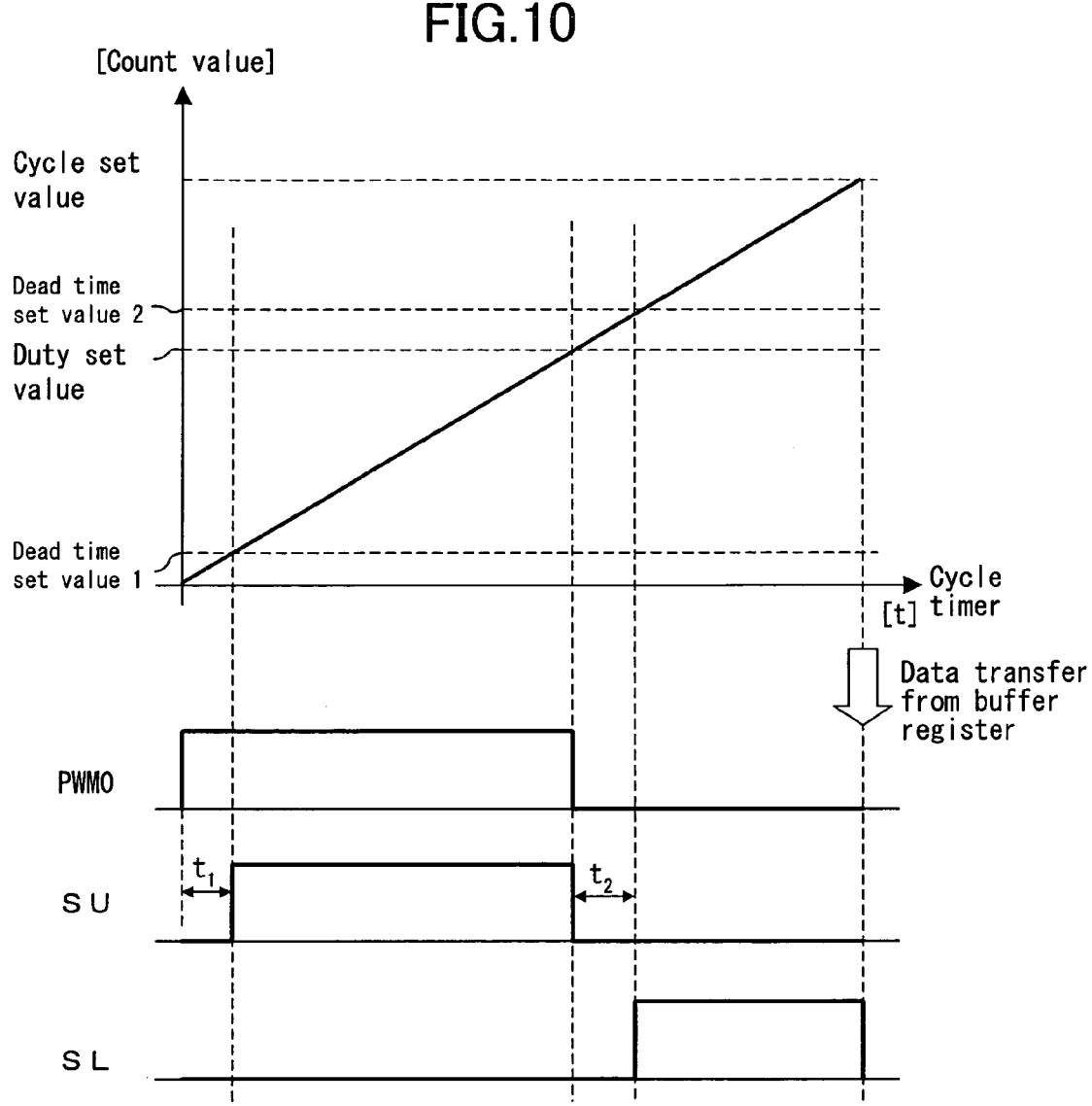
FIG. 10 is a timing chart for showing the operation of the semiconductor device of FIG. 9.
Figure 11:
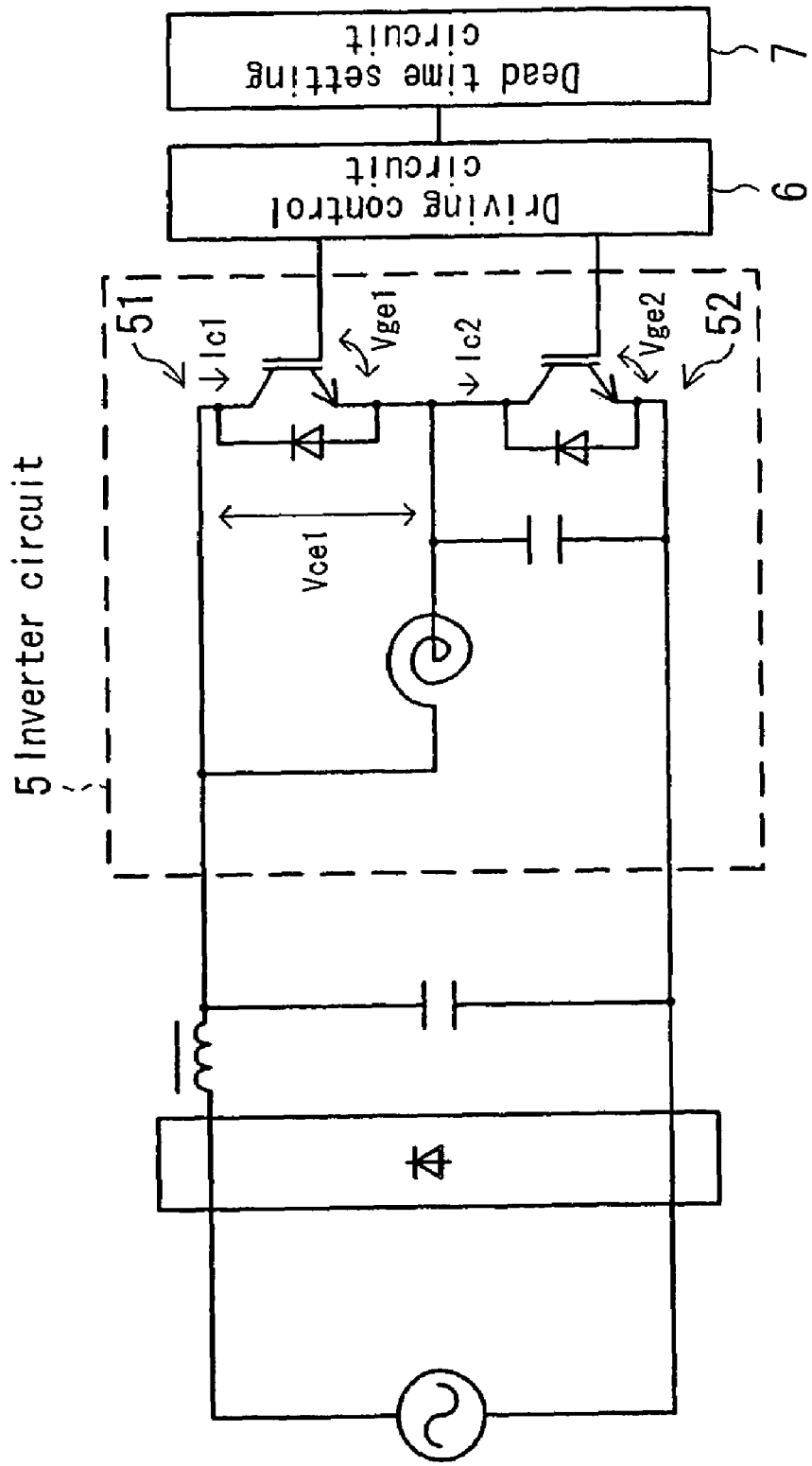
FIG. 11 is a diagram for showing an exemplified architecture of a circuit having a dead time setting function.
Figure 12A:
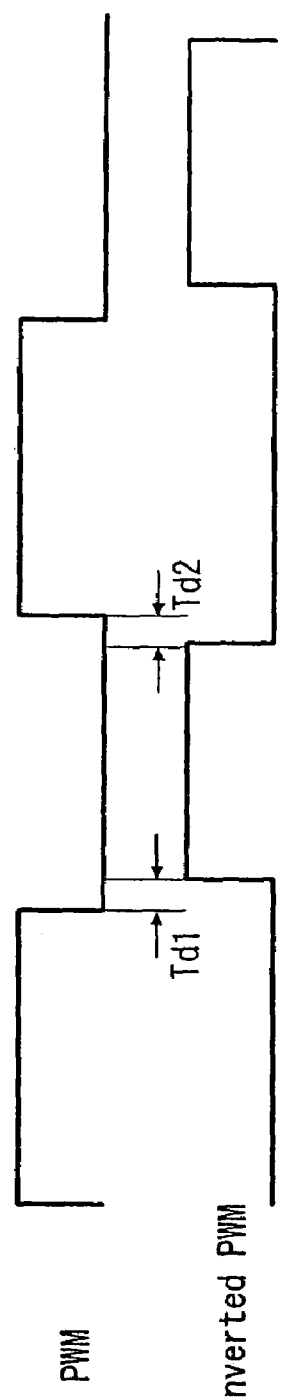
FIGS. 12A and 12B are diagrams for explaining a dead time and its role.
Figure 12B:
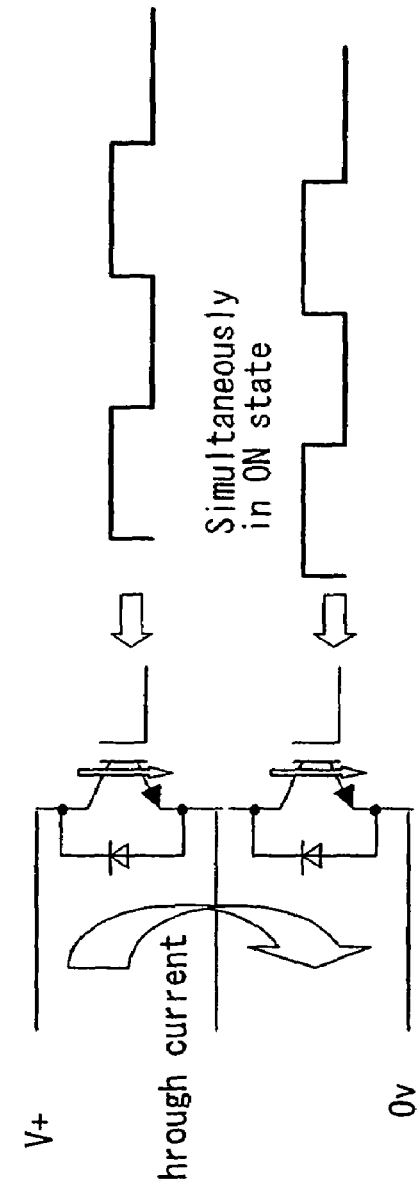
Figure 14:
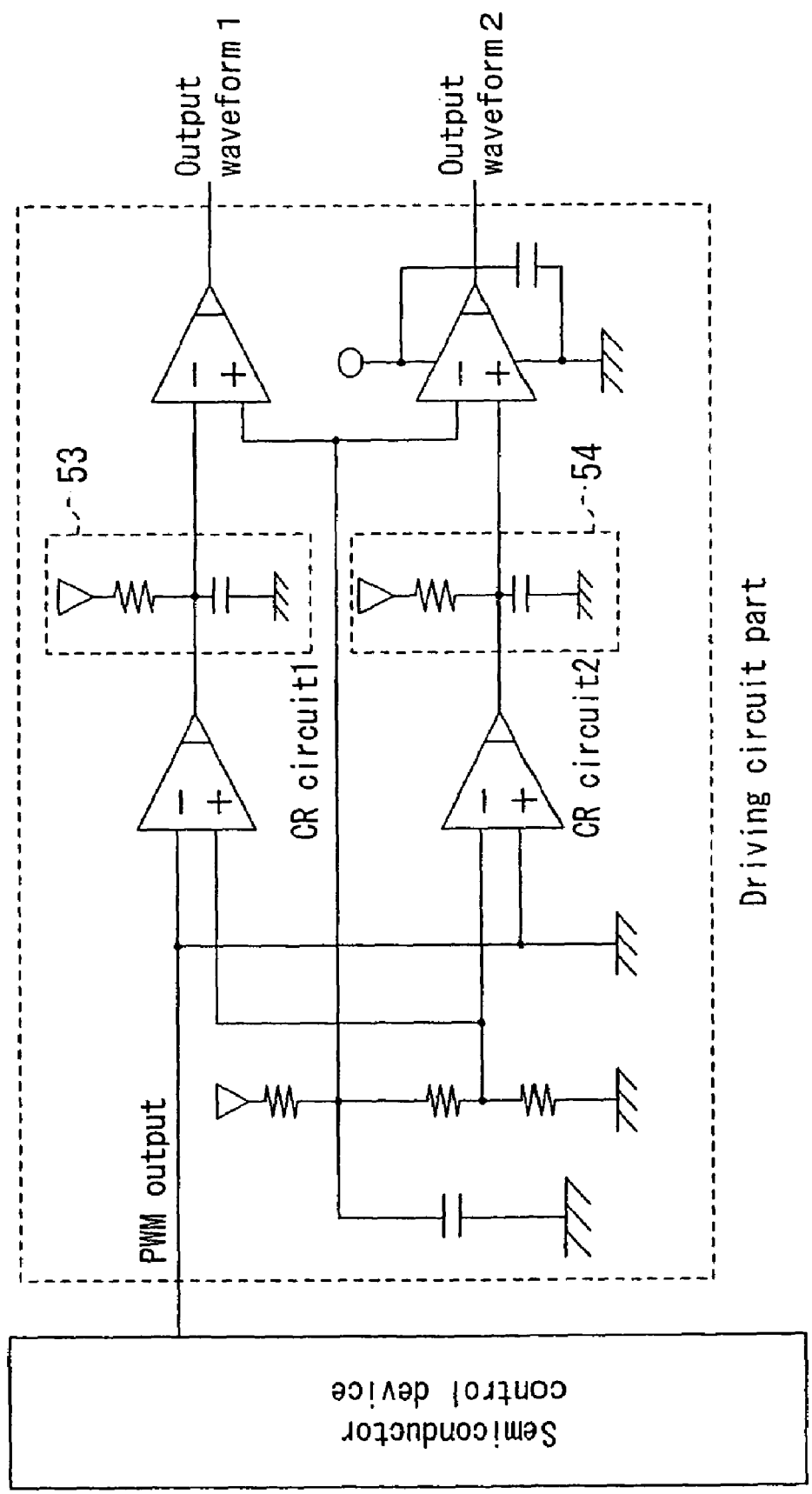
FIG. 14 is a diagram for showing another architecture of a circuit having a dead time setting function.
Figure 15:
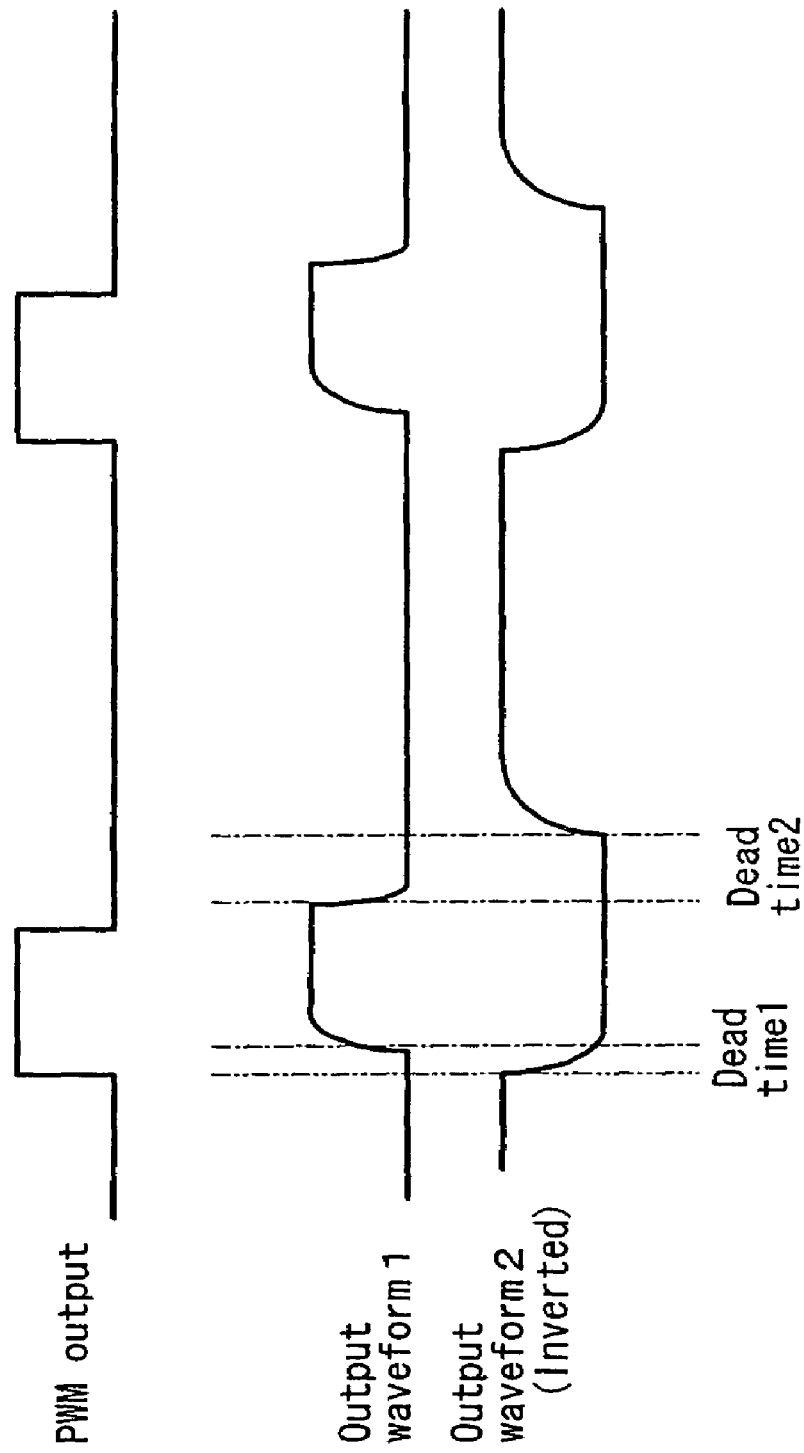
FIG. 15 is a timing chart for showing the operation of the circuit of FIG. 14.

FIG. 10 is a timing chart for showing the operation of the semiconductor device of FIG. 9, which is basically the same as that of Embodiment 4, whereas there is no need to switch the comparison reference of the comparator and hence the operation is simplified.

In other words, according to this embodiment, although one comparator is additionally provided to the architecture of Embodiment 4, there is no need to switch the comparison reference as in Embodiment 4. In addition, this architecture can be realized simply by disposing the same two circuits. Furthermore, the circuit of the comparator can be obtained by using a circuit included in a general microcomputer, which can be easily realized.

It is noted that, in an inverter circuit for driving a motor, switching circuits are provided in parallel for three phases, and therefore, the function to add dead times described in each of the aforementioned embodiments is applicable to such an inverter circuit, which results in attaining effects similar to those described in each embodiment.

Embodiment 6

Figure 16:
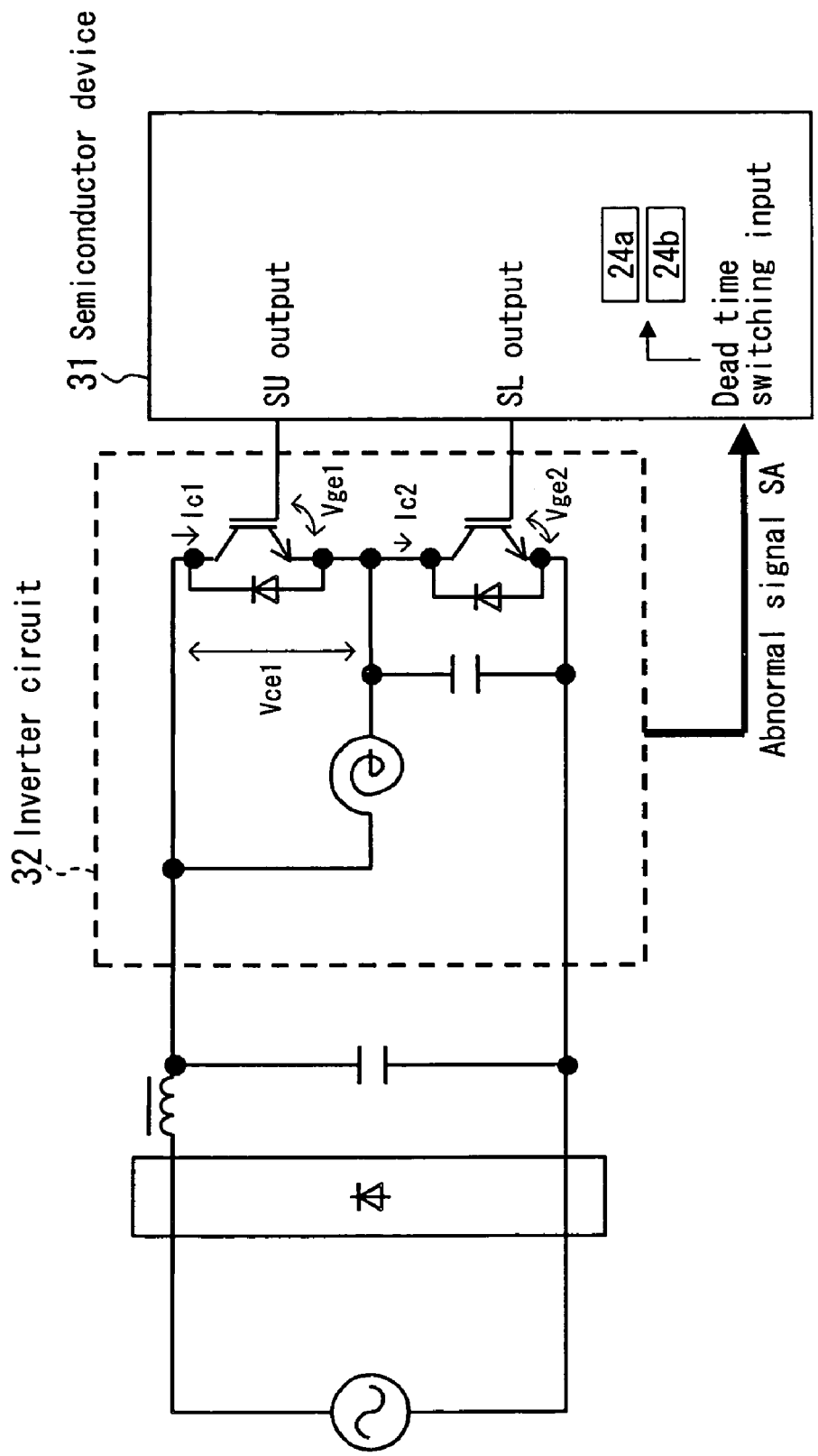
FIG. 16 is a diagram for showing the architecture of an induction heating apparatus according to Embodiment 6 of the invention.

FIG. 16 is a diagram for showing the architecture of an induction heating apparatus according to Embodiment 6 of the invention. In FIG. 16, a semiconductor device 31 has the same architecture as that described in each of the aforementioned embodiments, and controls an inverter circuit 32 for performing a heating operation with a coil by supplying an upper phase signal SU and a lower phase signal SL. Furthermore, in the semiconductor device 31, at least one of first and second dead times can be changed in accordance with a dead time switching input. Change of the dead time can be realized by, for example, changing set values of the first and second dead time set registers 24a and 24b by software in accordance with external interrupt.

Figure 17:
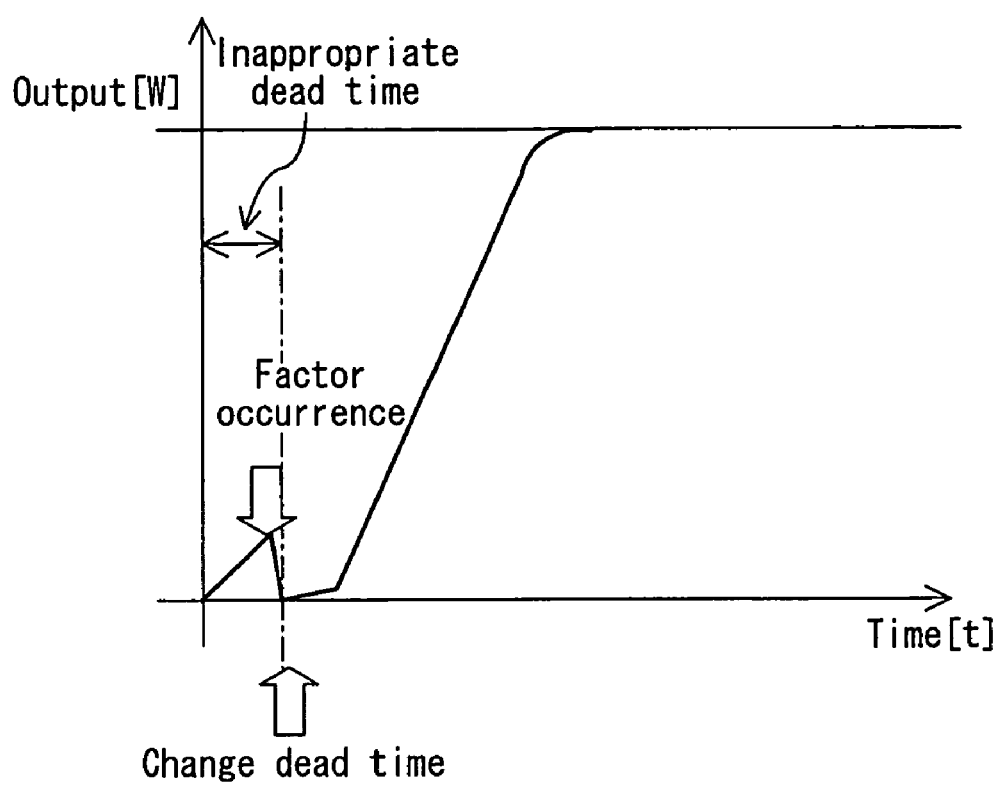
FIG. 17 is a timing chart for showing control for changing a dead time in Embodiment 6 or 7 of the invention.

The change of the dead time according to this embodiment will now be described with reference to FIG. 17. FIG. 17 is a timing chart for showing output change caused when the heating operation is started in the induction heating apparatus of FIG. 16 with a dead time set inappropriately. First, the output is once increased in accordance with normal heating sequence, but when the dead time is not appropriately set, the inverter circuit 32 outputs an abnormal signal SA corresponding to abnormal heating (which corresponds to "factor occurrence"). When the semiconductor device 31 accepts this abnormal signal as the dead time switching input, the change of the dead time is executed. Specifically, after immediately stopping the heating operation by accepting the dead time switching input as an external interrupt input, the set value of the dead time is rapidly changed, so as to start the heating operation with the appropriate dead time set value. Thus, the induction heating apparatus is normally operated thereafter.

Herein, the abnormal signal is output as a result of detection of excess current or excess voltage. For example, the output of a heating sensor is compared with a numerical value set within the normal range by a comparator or the like, and when the output of the sensor does not fall within the normal range, the abnormal signal is output. Such a mechanism for outputting the abnormal signal is conventionally provided to an inverter circuit, and hence is not herein described in detail.

Embodiment 7

Figure 18:
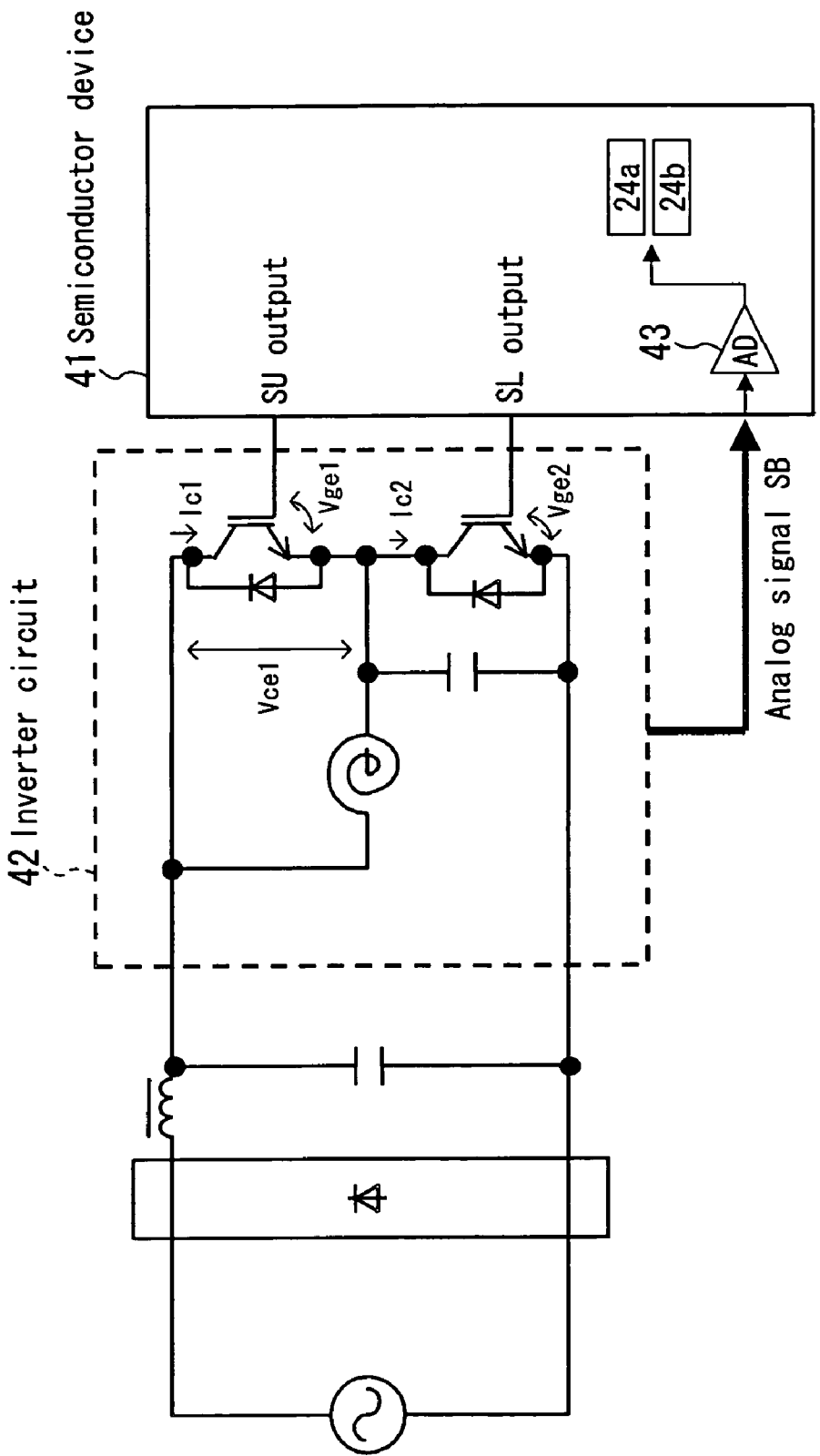
FIG. 18 is a diagram for showing the architecture of an induction heating apparatus according to Embodiment 7 of the invention.

FIG. 18 is a diagram for showing the architecture of an induction heating apparatus according to Embodiment 7 of the invention. In FIG. 18, a semiconductor device 41 has the same architecture as that described in each of the aforementioned embodiments, and controls an inverter circuit 42 for performing a heating operation with a coil by supplying an upper phase signal SU and a lower phase signal SL. Furthermore, in the semiconductor device 41, at least one of first and second dead times can be changed in accordance with a dead time switching input.

The control for changing the dead time according to this embodiment is performed in a similar manner to Embodiment 6 as shown in FIG. 17. The inverter circuit 42 outputs an analog signal SB corresponding to a current value of a heating coil current as the dead time switching input. The semiconductor device 41 includes an A/D converter 43 and converts the accepted analog signal SIB by using the A/D converter 43. When the resultant converted value does not fall within a predetermined range of the normal operation, after stopping the heating operation immediately, the dead time is rapidly changed, so as to start the heating operation with the appropriate dead time set value.

As compared with Embodiment 6, this embodiment has a merit that a decision value for detecting the abnormal heating in the inverter circuit 42 can be easily changed on the side of the semiconductor device 41 by, for example, software.

In each of Embodiments 6 and 7, an initial value of the set value of the dead time employed at the start of the heating operation may be set to a value for a heating object with a given property, and apart from this value, and several kinds of values for possible heating objects with different properties may be prepared as candidates for the change. Then, the set value of the dead time is successively switched by, for example, software, so as to realize an optimum heating characteristic suitable to a heating object. For example, with respect to an IH cooking device, that is, one of induction heating apparatuses, set values of the dead time are previously prepared respectively for a pot of aluminum or the like, which cannot be conventionally heated with the IH cooking device, and for a conventionally usable pot of iron or the like. When these two kinds of set values are appropriately switched, optimum control for each pot can be realized.

As described so far, according to this invention, different dead times can be respectively set for a PWM signal and an inverted PWM signal. Therefore, there is no need to change/set an optimum value of a dead time on a circuit, and dead times can be individually optimally set. As a result, advanced control with less power loss can be realized.

According to the present invention, since dead times can be individually set for complimentary PWM signals, control of an inverter in an induction heating apparatus such as an IH cooking device can be more flexibly realized than in the conventional technique.

What is claimed is:

1. A semiconductor device for controlling an inverter circuit comprising:
   a complementary PWM signal generation unit for generating a first PWM signal and a second PWM signal corresponding to an inverted signal of the first PWM signal;
   a dead time calculating unit for calculating a first dead time and a second dead time, the first dead time determined in response to a comparison between a count value of a timer and a first value stored in a register and the second dead time determined in response to a comparison between a count value of a timer and a second value stored in a register;
   a first dead time addition unit for delaying a first edge of the first PWM signal by a first delay value corresponding to the first dead time and for outputting a modified first PWM signal having the first delayed edge instead of the first edge to control the inverter circuit; and
   a second dead time addition unit for delaying a second edge of the second PWM signal by a second delay value corresponding to the second dead time, the second edge of the second PWM signal having the same direction of change as that of the first edge of the first PWM signal, and for outputting a modified second PWM signal having the delayed second edge instead of the second edge to control the inverter circuit.

2. The semiconductor device of claim 1,
   wherein the dead time calculating unit includes:
   a first register for receiving the first value and the second value from a second register and storing the first value or the second value in response to the receipt; and
   a dead time timer for updating a count value and for calculating the first dead time and the second dead time in response to the count value, the dead time timer starting counting in response to either receiving the first edge of the first PWM signal or receiving the second edge of the second PWM signal and stopping counting in response to either a coincidence between the count value of the dead time timer and the first value stored in the first register or a coincidence between the count value of the dead time timer and the second value stored in the first register,
   wherein the first value is stored in the first register when calculating the first dead time and the second value is stored in the first register when calculating the second dead time.

3. The semiconductor device of claim 2,
   wherein the complementary PWM signal generation unit includes:
   a duty register for storing a third value;
   a cycle register for storing a fourth value; and
   a cycle timer for updating a count value,
   and the first and second PWM signals are generated from a reference PWM signal generated in response to both a coincidence between the count value of the cycle timer and the third value stored in the duty register and a coincidence between the count value of the cycle timer and the fourth value stored in the cycle register,
   wherein the second value stored in the second register is transferred to the first register in response to the coincidence between the count value of the cycle timer and the third value stored in the duty register and the first value stored in the second register is transferred to the first register in response to the coincidence between the count value of the cycle timer and the fourth value stored in the cycle register.

4. The semiconductor device of claim 1,
   wherein the dead time calculating unit includes:
   a first register for receiving the first value from a first buffer register and storing the first value;
   a second register for receiving the second value from a second buffer register and storing the second value; and
   a dead time timer for updating a count value and for calculating the first dead time and the second dead time in response to the count value, the dead time timer starting counting in response to either receiving the first edge of the first PWM signal or receiving the second edge of the second PWM signal and stopping counting in response to either a coincidence between the count value of the dead time timer and the first value stored in the first register or a coincidence between the count value of the dead time timer and the second value stored in the second register.

5. The semiconductor device of claim 4,
wherein the complementary PWM signal generation unit includes:
a duty register for storing a third value;
a cycle register for storing a fourth value; and
a cycle timer for updating a count value,
and the first and second PWM signals are generated from
a reference PWM signal generated in response to both
a coincidence between the count value of the cycle timer and the third value stored in the duty register and
a coincidence between the count value of the cycle timer and the fourth value stored in the cycle register,
wherein the first value stored in the first buffer register is transferred to the first register in response to the coincidence between the count value of the cycle timer and the fourth value stored in the cycle register and the second, value stored in the second buffer register is transferred to the second register in response to the coincidence between the count value of the cycle timer and the fourth value stored in the cycle register.

6. The semiconductor device of claim 1,
wherein the dead time calculating unit includes:
a first register for receiving the first value from a first buffer register and storing the first value;
a second register for receiving the second value from a second buffer register and storing the second value;
a first dead time timer for updating a count value and for calculating the first dead time in response to the count value of the first dead time timer, the first dead time timer starting counting in response to receiving the first edge of the first PWM signal and stopping counting in response to a coincidence between the count value of the first dead time timer and the first value stored in the first register; and
a second dead time timer for updating a count value and for calculating the second dead time in response to the count value of the second dead time timer, the second dead time timer starting counting in response to receiving the second edge of the second PWM signal and stopping counting in response to a coincidence between the count value of the second dead time timer and the second value stored in the second register.

7. The semiconductor device of claim 6,
wherein the complementary PWM signal generation unit includes:
a duty register for storing a third value;
a cycle register for storing a fourth value; and
a cycle timer for updating a count value,
and the first and second PWM signals are generated from
a reference PWM signal generated in response to both
a coincidence between the count value of the cycle timer and the third value stored in the duty register and
a coincidence between the count value of the cycle timer and the fourth value stored in the cycle register,
wherein the first value stored in the first buffer register is transferred to the first register in response to the coincidence between the count value of the cycle timer and the fourth value stored in the cycle register and the second value stored in the second buffer register is transferred to the second register in response to the coincidence between the count value of the cycle timer and the fourth value stored in the cycle register.

8. The semiconductor device of claim 1,
wherein the complementary PWM signal generation unit includes:
a duty register for storing a third value;
a cycle register for storing a fourth value; and
a cycle timer for updating a count value,
and the first and second PWM signals are generated from
a reference PWM signal generated in response to both
a coincidence between the count value of the cycle timer and the third value stored in the duty register and
a coincidence between the count value of the cycle timer and the fourth value stored in the cycle register,
wherein said dead time addition unit includes:
a first register for receiving the first value from a first buffer register and storing the first value;
a second register for receiving the second value from a second buffer register and storing the second value; and
a comparator for comparing the count value of the cycle timer with either the first value stored in the first register or the second value stored in the second register and calculating the first dead time and the second dead time in response to a result of the comparison of the comparator.

9. The semiconductor device of claim 8,
wherein the first value stored in the first buffer register is transferred to the first register in response to the coincidence between the count value of the cycle timer and the fourth value stored in the cycle register and the second value stored in the second buffer register is transferred to the second register in response to the coincidence between the count value of the cycle timer and the fourth value stored in the cycle register.

10. The semiconductor device of claim 1,
wherein the complementary PWM signal generation unit includes:
a duty register for storing a third value;
a cycle register for storing a fourth value; and
a cycle timer for updating a count value,
and the first and second PWM signals are generated from
a reference PWM signal generated in response to both
a coincidence between the count value of the cycle timer and the third value stored in the duty register and
a coincidence between the count value of the cycle timer and the fourth value stored in the cycle register,
wherein said dead time addition unit includes:
a first register for receiving the first value from a first buffer register and storing the first value;
a second register for receiving the second value from a second buffer register and storing the second value;
a first comparator for comparing the count value of the cycle timer with the first value stored in the first register and calculating the first dead time in response to a result of the comparison of the first comparator; and
a second comparator for comparing the count value of the cycle timer with the second value stored in the second register and calculating the second dead time in response to a result of the comparison of the second comparator.

11. The semiconductor device of claim 10,
wherein the first value stored in the first buffer register is transferred to the first register in response to the coincidence between the count value of the cycle timer and the fourth value stored in the cycle register and the second value stored in the second buffer register is transferred to the second register in response to the coincidence between the count value of the cycle timer and the fourth value stored in the cycle register.

* * * * *